Patented May 8, 1945

UNITED STATES PATENT OFFICE 2,375,495

CATALYTIC HYDROGENATION PROCESSES

Albert S. Richardson, Wyoming, and James E. Taylor, Cincinnati, Ohio, assignors to The Procter and Gamble Company, Ivorydale, Ohio, a corporation of Ohio No Drawing. Application July 7, 1942,
Serial No. 450,074

13 Claims. (Cl. 260—638)

Our invention relates to catalytic hydrogenation processes. More particularly, it relates to the employment of cadmium-modified copper-containing catalysts in the production of fatty alcohols from corresponding fatty acids or their esters.

The object of our invention is to provide an improved method for the manufacture of alcohols by the catalytic hydrogenation of the corresponding carboxylic acids and their esters, especially to provide a method for efficient conversion of unsaturated fatty acids to higher alcohols with relatively little saturation of the double bonds.

Of the known methods for reducing fatty acids to higher alcohols, the principal one in practical use is hydrogenation at high temperature and pressure in the presence of a copper-containing catalyst, but, where the production of unsaturated alcohols is desired, such catalytic method has had little or no practical use. Various methods, including several ways of adding cadmium compounds, have been proposed for poisoning the copper-containing catalyst selectively with respect to addition of hydrogen to the olefinic linkage of an unsaturated fatty acid, i. e., for decreasing the rate of hydrogenation at the double bond without causing a corresponding decrease in the activity of the catalyst for conversion of the acid or its ester to alcohol. However, as far as we are aware, no catalyst has previously been developed with a selective activity of this kind in sufficiently high degree to be suitable for commercial use.

In our process, we prepare an active copper-containing catalyst according to any of the known methods and subsequently modify its activity. We have found that cadmium is particularly effective for inhibiting the tendency of such a catalyst to cause hydrogenation at the olefinic linkage when together with the copper catalyst it is introduced into the reaction mixture in the form of cadmium soap. This may be done most conveniently by converting to cadmium soaps a portion, for example, about ten per cent, of the same fatty acids which are to be subjected to hydrogenation. The cadmium soaps do not persist as such, but form a part of the fatty material subject to conversion to higher alcohol. The activity of the copper catalyst for hydrogenation of the acid to alcohol actually tends to be increased.

In our copending applications, Serial No. 380,072, filed February 21, 1941, and Serial No. 438,852, filed April 13, 1942, we described processes for the formation of alcohols by hydrogenating certain derivatives of the corresponding carboxylic acids, employing copper soaps and cadmium soaps and mixtures thereof. Our present invention differs from the processes of those earlier applications in that in the present case the material to be hydrogenated consists primarily of fatty acids, or in some cases esters thereof, and in that an added copper hydrogenation catalyst, not copper soap, is employed.

The following specific examples will illustrate preferred conditions for the practice of our process on a small scale.

*Example 1.*—A quantity of copper chromite hydrogenation catalyst was prepared by pouring together, at 40° C., a solution of 1928 grams of $Cu(NO_3)_2 \cdot 3H_2O$ in 4 liters of water and a solution of 800 grams of $CrO_3$ in 3.2 liters of water, and to this combined solution adding ammonium hydroxide until precipitation was complete. This required about 1360 cubic centimeters of ammonium hydroxide of specific gravity 0.9. The precipitate was filtered, dried at 70° C. and then heated to at least 400° C. until black. After cooling, it was screened through a 300 mesh sieve.

A quantity of cadmium oleate was prepared by adding an aqueous solution of cadmium nitrate to an aqueous solution containing an equivalent amount of potassium soap of commercial oleic acid, followed by washing and drying the resulting precipitate.

A mixture of 85 grams of commercial oleic acid, 15 grams of the cadmium oleate, and 10 grams of the copper chromite catalyst, was charged into a stainless steel bomb of about 300 cubic centimeters capacity. After closing the bomb and sweeping out the air, hydrogen was admitted under 2000 pounds per square inch pressure, the bomb was heated to 280° C. during a period of 1½ to 2 hours, the hydrogen pressure was then raised to 4000 pounds per square inch, and agitation was started by rocking the bomb. The agitation was continued, while maintaining the 4000 pounds per square inch hydrogen pressure, for 2½ hours, after which the bomb was slowly cooled to room temperature and its contents removed. The crude reaction product was boiled for 2 hours with 10% hydrochloric acid solution, then washed free of mineral acid and dried.

This acid washed product was found to have a saponification value of 13.6, indicating about 93% reduction of carboxyl groups; an iodine value of 75, indicating the saturation of about 20% of the double carbon bonds; an acid value of 0.9, and a hydroxyl value of 185, indicating the presence of 85% free alcohol, or 93% total alcohol including that combined as ester. Aside from free and combined alcohol and free and combined fatty acid, this product contained only about 2% of impurities, which might include hydrocarbons, ethers, and ketones.

Free alcohol was obtained from the acid washed material by reacting free fatty acids and esters in this material with caustic alkali, extracting with ether, and distilling off this solvent. The step of separating the free alcohol from the alkali soap may alternatively be accomplished by distillation or by any other convenient method.

In a similar hydrogenation of oleic acid with copper chromite catalyst, but without added cadmium oleate as called for in the present invention, the percentage reduction of carboxyl groups was only .64% and the iodine value of the acid washed product was only 6, thus indicating a lower alcohol yield and a far greater degree of saturation of olefinic double bonds.

*Example 2.*—In a hydrogenation procedure similar to that of Example 1, except that the reaction temperature was 340° C. and the time of agitation at the reaction temperature was 6 hours, a mixture of 90 grams of oleic acid, 10 grams of the cadmium oleate, and 5 grams of the copper chromite catalyst, yielded an acid washed product having an iodine value of 49, with a percentage reduction of carboxyl groups of 97.

In a similar hydrogenation of oleic acid with copper chromite catalyst, but without added cadmium oleate, the percentage reduction of carboxyl groups was 97, and the iodine value of the acid washed product was less than 1.

*Example 3.*—In a hydrogenation exactly similar in ingredients and procedure to that of Example 2, except that the time of agitation at the reaction temperature was only 3 hours, the acid washed product had an iodine value of 87 and showed 54% reduction of carboxyl groups.

In a comparison hydrogenation, without the added cadmium oleate, the acid washed product had an iodine value of 14 and showed 38% reduction of carboxyl groups.

In general, we prefer to use, in carrying out our process, up to about ten per cent of copper chromite or other copper-containing hydrogenation catalyst, and from about five per cent to about twenty per cent of cadmium soap, basing the calculation of percentages upon the total weight of material to be hydrogenated including cadmium soap.

The fatty acids of the cadmium soap, and also the free fatty acids to be hydrogenated, may be fatty acids derived from any naturally occurring glyceride oil, either hydrogenated or unhydrogenated, or derived from rosin or natural waxes, or from oxidized petroleum products, etc. The fatty acids of the cadmium soap are preferably, but not necessarily, similar to the free fatty acids to be hydrogenated.

Our process is also applicable to the hydrogenation of glyceride oils, or other esters of fatty acids, for example, the ethyl esters, with copper-containing hydrogenation catalysts. In this case we find that the employment of cadmium soap retards the hydrogenation of double carbon bonds much the same as it does in the hydrogenation of unsaturated fatty acids, but it does not positively promote the reduction of carboxyl groups as it does in the hydrogenation of fatty acids.

Our process may be used also for the catalytic hydrogenation of other oxygen-containing compounds when present in reaction mixtures in which it is desirable to inhibit hydrogenation at unsaturated linkages between carbon atoms.

Preferred conditions for our process include the maintenance of temperatures between about 200° C. and 350° C., hydrogen pressure in excess of 2000 pounds per square inch, the provision of some form of agitation to promote intimate contact between the hydrogen and the reacting materials, the maintenance of a constant supply of hydrogen, and time under these conditions sufficient for substantial completion of the desired reaction.

Having thus described our invention, what we claim and desire to secure by Letters Patent is:

1. In the catalytic hydrogenation of compounds selected from the group consisting of fatty acids and esters thereof to form fatty alcohols, in the presence of a copper-containing catalyst at high temperature and pressure, the step of incorporating a substantial yet not predominant proportion of cadmium soap in the mixture to be hydrogenated.

2. The process of forming higher alcohols, which comprises subjecting to reaction with hydrogen at high temperature and pressure a mixture of fatty acids corresponding to said alcohols and a relatively smaller yet substantial proportion of cadmium soap, in the presence of a copper-containing hydrogenation catalyst.

3. The process of claim 2, in which the catalyst is a copper chromite catalyst.

4. The process of claim 2, in which the fatty acids subjected to hydrogenation comprise a substantial proportion of unsaturated fatty acids.

5. The process of forming unsaturated fatty alcohols which comprises subjecting to reaction with hydrogen at high temperature and pressure, in the presence of a copper-containing catalyst, a compound selected from the group consisting of fatty acids and fatty acid esters and a relatively smaller yet substantial proportion of a cadmium soap.

6. The process of claim 5, in which the catalyst is a copper chromite catalyst.

7. The process of forming unsaturated fatty alcohols which comprises subjecting to reaction with hydrogen at a temperature between about 200° C. and about 350° C., at a hydrogen pressure in excess of 2000 pounds per square inch, and in the presence of a copper-containing catalyst, a compound selected from the group consisting of fatty acids and fatty acid esters and a relatively smaller yet substantial proportion of cadmium soap.

8. The process of forming unsaturated higher alcohols, which comprises subjecting to reaction with hydrogen at high temperature and pressure a mixture of glycerides of fatty acids corresponding to said alcohols and a relatively smaller yet substantial proportion of cadmium soap, in the presence of a copper-containing hydrogenation catalyst.

9. The process of claim 8, in which the catalyst is a copper chromite catalyst.

10. The process of forming unsaturated fatty alcohols which comprises subjecting to reaction with hydrogen at high temperature and pressure, in the presence of a copper-containing catalyst, a mixture of unsaturated fatty acids and a relatively smaller yet substantial proportion of cadmium soaps thereof.

11. The process of forming unsaturated fatty alcohols which comprises subjecting to reaction with hydrogen at a temperature between about 200° C. and about 350° C., at a hydrogen pressure in excess of 2000 pounds per square inch, and in the presence of a copper-containing catalyst, a mixture of unsaturated fatty acids and a relatively smaller yet substantial proportion of cadmium soap.

12. The process of claim 11, in which the catalyst is a copper chromite catalyst.

13. The process of claim 2, in which the proportion of cadmium soap is between five per cent and twenty per cent of the total weight of the fatty acids plus cadmium soap in the original reaction mixture.

ALBERT S. RICHARDSON.
JAMES E. TAYLOR.